US006292856B1

(12) United States Patent
Marcotte

(10) Patent No.: US 6,292,856 B1
(45) Date of Patent: Sep. 18, 2001

(54) SYSTEM AND METHOD FOR APPLICATION INFLUENCE OF I/O SERVICE ORDER POST I/O REQUEST

(75) Inventor: Scott Thomas Marcotte, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,719

(22) Filed: Jan. 29, 1999

(51) Int. Cl.$^7$ ...................................................... G06F 13/00
(52) U.S. Cl. .................................. 710/39; 710/5; 710/52; 710/263; 709/103
(58) Field of Search ................................... 709/100–107; 710/5–7, 22–30, 36–45, 52–57, 260–263; 711/3, 117

(56) References Cited

U.S. PATENT DOCUMENTS

| | | | |
|---|---|---|---|
| 3,725,864 | 4/1973 | Clark et al. | 340/172.5 |
| 4,783,730 * | 11/1988 | Fischer | 710/5 |
| 4,972,364 * | 11/1990 | Barrett et al. | 711/117 |
| 5,131,081 | 7/1992 | Mac Kenna et al. | 395/275 |
| 5,220,653 | 6/1993 | Miro | 395/275 |
| 5,247,675 * | 9/1993 | Farrell et al. | 709/103 |
| 5,261,065 | 11/1993 | Urabe et al. | 395/425 |
| 5,446,855 * | 8/1995 | Dang et al. | 711/1 |
| 5,459,864 * | 10/1995 | Brent et al. | 709/105 |
| 5,499,384 | 3/1996 | Lentz et al. | 395/821 |
| 5,515,521 * | 5/1996 | Whitted, III et al. | 711/3 |
| 5,630,128 * | 5/1997 | Farrell et al. | 709/103 |
| 5,754,887 * | 5/1998 | Damron et al. | 710/39 |
| 5,784,647 | 7/1998 | Sugimoto | 395/859 |
| 5,799,173 * | 8/1998 | Gossler et al. | 395/500.42 |
| 5,819,112 * | 10/1998 | Kusters | 710/36 |
| 5,922,057 * | 7/1999 | Holt | 710/52 |
| 5,938,747 * | 8/1999 | Young | 710/53 |
| 6,018,779 * | 1/2000 | Blumenau | 710/68 |
| 6,025,255 * | 2/2000 | Chen et al. | 438/595 |
| 6,058,426 * | 5/2000 | Godwin et al. | 709/229 |
| 6,065,088 * | 5/2000 | Bronson et al. | 710/263 |
| 6,157,962 * | 12/2000 | Hodges et al. | 710/1 |
| 6,202,101 * | 3/2001 | Chin et al. | 710/5 |

FOREIGN PATENT DOCUMENTS

| | | | |
|---|---|---|---|
| 7239756 | 9/1995 | (JP) | G06F/3/06 |
| 9034726 | 2/1997 | (JP) | G06F/9/46 |

OTHER PUBLICATIONS

"Enhancements to I/O Priority Queueing", IBM Technical Disclosure Bulletin, vol. 36, No. 06A, Jun. 1993, p. 485–488.

Turkan, Y. et al. "An efficient memory management algorithm for client–server database management systems." *Turkey Computer Journal*, vol. 39, No. 5, pp. 374–385, 1996, Inspec abstract INSM AN 5419925.

Wen Jiin Tsai, et al. "Real–time scheduling of multimedia data retrieval to minimize buffer requirement", *Operating Systems Review*, vol. 30, No. 3, pp. 67–80, Jul. 1996, Inspec abstract INSM AN 5327937.

Kim, W. et al. "Enhancing real–time DBMS performance with multiversion data and priority based disk scheduling." Proceedings. Twelfth Real–Time Systems Symposium, pp. 222–231, 1991, Inspec abstract ISNM AN 4189165.

* cited by examiner

Primary Examiner—Christopher B. Shin
(74) Attorney, Agent, or Firm—Shelley M Beckstrand

(57) ABSTRACT

System and method for scheduling I/O requests in a multitasking data processing environment. An I/O request issued by an application is placed in an I/O request holding queue. Under control of the requesting application (or, alternatively, the operating system), the I/O request is selectively canceled or moved to a service pending queue for execution. Requests can be moved either by the application or by the Operating system when an I/O completes (and hence the service pending queue has room for another IO).

15 Claims, 9 Drawing Sheets

SYSTEM AND METHOD FOR APPLICATION INFLUENCE OF I/O SERVICE ORDER POST I/O REQUEST

BACKGROUND OF THE INVENTION

1. Technical Field of the Invention

This invention relates to scheduling of input/output functions relative to input/out (I/O) devices in a multitasking data processing system. More particularly, it relates to a system and method for enabling applications to influence the order of service of an I/O request after the I/O request has been submitted.

2. Background Art

In contemporary multitasking data processing systems, such as is illustrated in FIG. 1, the operating system 32 of processor 20 schedules input/output operations with respect to input/output device 24 through device interface 34 over I/O bus 28 responsive to I/O requests from applications 30. Typically, I/O device 28 is a long term storage device, such as a magnetic disk. Main storage 22 includes program and data storage which is accessible to processor 20 over bus 26.

Referring to FIG. 2, in one contemporary multitasking data processing system, an operating system 32 schedules input/output tasks or operations in a first-come first-served manner. In such systems, if blocks A, B and C are written to disk, they would complete in that specific order. A user application 30, which may or may not be running on the same system (for example, the file system could be a distributed file system), makes file access or update requests to the file system 40. The file system then determines the disk I/O needed to satisfy the file requests made by user application 30 and issues I/O requests to the I/O driver 42. The I/O driver formats the requests to a format required by the Media Manager 44 and sends the requests on to Media Manager 44 for processing. The Media Manager 44 performs no optimization or I/O ordering for efficiency, it handles requests first-come first-served. The Media Manager 44 creates the channel program 52 and sends the channel request to the device driver 46 which sends the request to the device 24 via the channel 28. The I/O driver 42 represents I/O requests by a control block 54 that can later be waited on by units of work (hereafter referred to as tasks) that are processing the file requests from the application. All I/O performed in the system is asynchronous, that is, I/O requests are made to the I/O driver 42 and must later be waited on to ensure completion via another (WAIT) request to the I/O driver 42 and specifying the corresponding I/O control block 54.

In this system, which is a logging file system, in order to reduce I/O rates in general, a group of blocks of data are read/written with respect to I/O device 24 at a time, rather than one physical disk block at a time. Metadata updates are logged to a logfile on disk, and metadata is only written to disk at periodic sync intervals and when the logfile is getting full so committed transactions can be freed and space made available in the logfile. Referring to FIG. 3, file system layer 40 uses five buffers in memory 22 to contain most recent written logfile pages 65–69. When all five buffers 65–69 are I/O pending, file system 40 waits for first log file page 65 to complete so it can re-use memory 22 buffer for a different logfile page. When writing large files, the disk I/O access pattern illustrated in FIG. 3 occurs repeatedly. That is, when application layer 30 writes large (over 1M) files to file system layer 40, file system layer 40 buffers and writes user data in 64K increments 61–64, etc. Thus, a 1M file entails 16 I/O requests 50 for user data, and would repeat the access pattern 61–65 four times. As logfile pages 65–68 fill, they have to be written out to disk 24. Thus, writing a large file usually mans writing some user data 61–64, and then writing a logfile page 65. Since, in this specific system, there are five buffers 65–69 for logfile information, the first five instances of pattern 61–65 occur really fast. The first 1M file (which is four instances of pattern 61–65, involving log files 65–68) completes with no I/O waits and gets over 1OM per second response time. The next 1M file, however, runs into the problem that the five buffers for the logfile I/O are pending I/O completion, and must wait for at least one of these I/Os to complete before proceeding. Thus, extra I/O wait time is incurred because the I/O requests for four data blocks 61–64, and one logfile block 65, must complete when writing the second file, and this repeats every 256K that is written to the second file. Note that when writing the second file, the user task is being made to wait for the I/O to complete for the first file (unnecessarily). This pattern repeats for subsequent files being written. This results in performance equivalent to synchronous file write performance instead of the asynchronous file performance the first file received. Any file after the first will get this synchronous write performance until it comes time to free up space in the log file 60 by writing metadata or the sync daemon (which writes metadata) runs. The default sync daemon runs every 30 seconds. When this happens, metadata write is added to the I/O queue in 256K increments and file system 40 waits for this I/O to complete before it can proceed. When log 60 is full, or a sync operation occurs, and since I/O is first-come, first-served, a wait for all preceding I/Os that are not completed occurs, and performance for the file being written goes way down to less that 300 KBs/sec.

The performance of I/O writes is then very erratic based on where the system is in the cycle when application 30 submits file write requests. Performance may be very fast because log buffers are available; sync rate because the logfile buffer must be made available before it can be written; very slow because metadata is being written out and all I/O needs to be complete before continuing; or very fast because as soon as the metadata is written, the system has all logfile buffers available to it.

In some contemporary multitasking data processing systems, operating systems execute various approaches for scheduling input/output requests or operations in sequences based upon task priorities.

For example, in one such system, U.S. Pat. No. 5,220,653 by F. Miro for scheduling input/output operations in multitasking systems, of common assignee, the teachings of which are incorporated herein by this reference, an improvement on elevator I/O scheduling is described. Elevator I/O scheduling is scheduling based on which part of the disk the I/O will read or write. The Miro priority scheme allows a priority to be associated with the I/O request when it is scheduled and that priority is used to order the I/O in importance. Miro also provides algorithms for dealing with starvation. Thus, Miro provides for sorting I/Os based on priority in such a manner as to prevent starvation. However, Miro does not provide a method or system for allowing an application to adjust I/O priority after the application has submitted to I/O request. Because an application does not necessarily know at the time of submission the priority required by its I/O request request, there is a need in the art for a method and system which allows the application to adjust the priority or even cancel the I/O request after its submission.

Generally, contemporary systems require that a user submit priority indicia concurrently with an I/O request, and then is at the mercy of the I/O code which handles the request to do any performance optimization, such as writing out data that is closest to he current device head next, or write out the smallest file next, and so forth. In such systems, the user application has no control or influence over its I/O requests after the I/O request is submitted.

The above problem and problems like it cannot be solved by the prior art—either using the elevator disk scheduling technique and/or the priority sorting based on tasks since they will not guarantee that the scheduler wait only on the I/O that is important first. The above example assumes only large files are written, but in a file system, what the future holds is not known, it is not known if a user application will write more data to the same file, write another file, remove a file, etc. Having no knowledge of the future, the scheduler can not predict whether a log, metadata or a user data page will be needed to be completed first. Thus priority and elevator solutions will not accomplish what needed. Furthermore a scheduling solution is needed which is general in the sense that it can be applied to any program that needs to manage its I/O in an order not related to initial assigned priority or disk head position.

It is an object of the invention to provide an improved system and method for I/O request scheduling.

It is a further object of the invention to provide an I/O system that minimizes the amount of time tasks need to wait for I/O, which for logging file systems will provide full asynchronous write performance which should yield throughput close to memory transfer speed and not physical device speed.

It is a further object of the invention to provide a system and method which enables an application to adjust the priority of an I/O request after that request has been issued but before the I/O has been issued to the physical channel connected to the device.

It is a further object of the invention to provide a system and method which enables an application to cancel an I/O request after that request has been issued.

It is a further object of the invention to enable a user application to adjust I/O priority when information is available identifying which I/O are most important.

SUMMARY OF THE INVENTION

In accordance with the invention, a system and method is provided for scheduling I/O requests. An I/O request issued by an application is placed in an I/O request holding queue. Under control of the requesting application (or, alternatively, the operating system), the I/O request is selectively canceled or moved to a service pending queue for execution.

Other features and advantages of this invention will become apparent from the following detailed description of the presently preferred embodiment of the invention, taken in conjunction with the accompanying drawings.

BEST MODE FOR CARRYING OUT THE INVENTION

The system and method of the invention allow direct application influence on the highest level of a device I/O queue. Only the application can know how important an I/O request is, and the system and method of the invention allow the application at a time after scheduling or issuing the I/O request to adjust the priority of the I/O request by moving it between queues or even canceling it.

Figure 4:
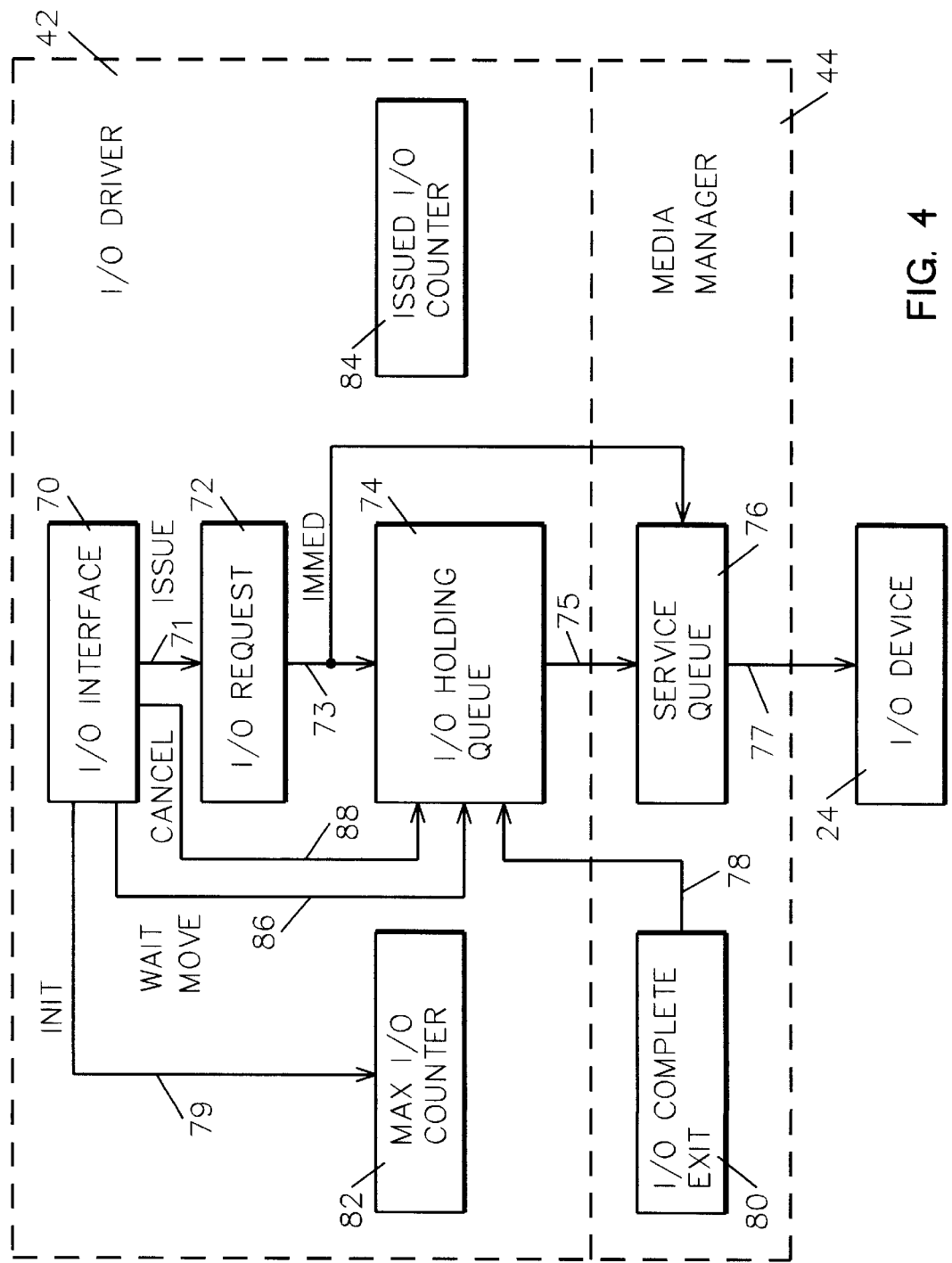
FIG. 4 illustrates a preferred embodiment of the system of the invention.

Referring to FIG. 4, a preferred embodiment of the system of the invention is set forth. FIGS. 5–9 accompany FIG. 4 and illustrate the method steps executed by the system components of FIG. 4.

Figure 1:
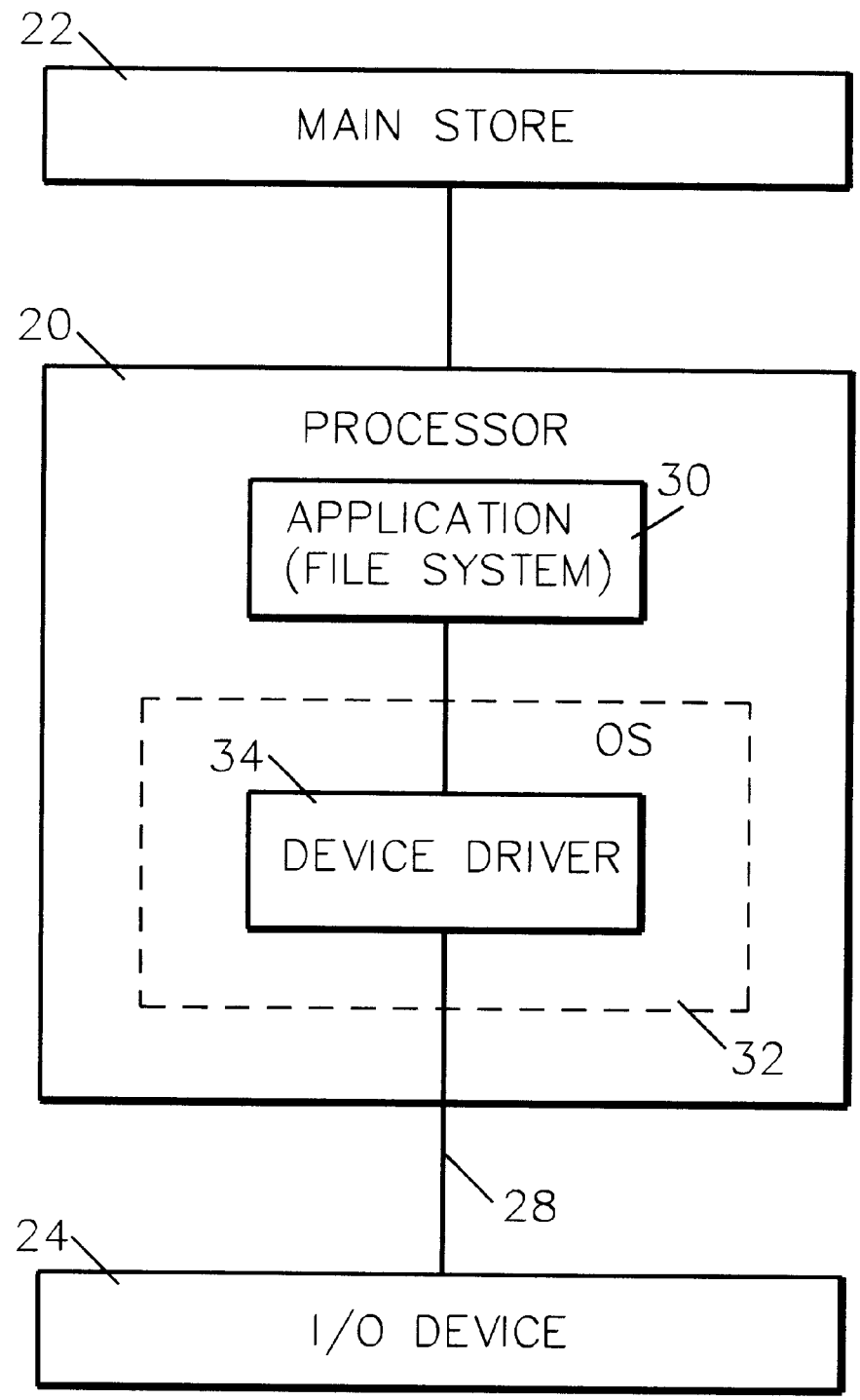
FIG. 1 illustrates a typical processing system for executing the method of the invention.
Figure 2:
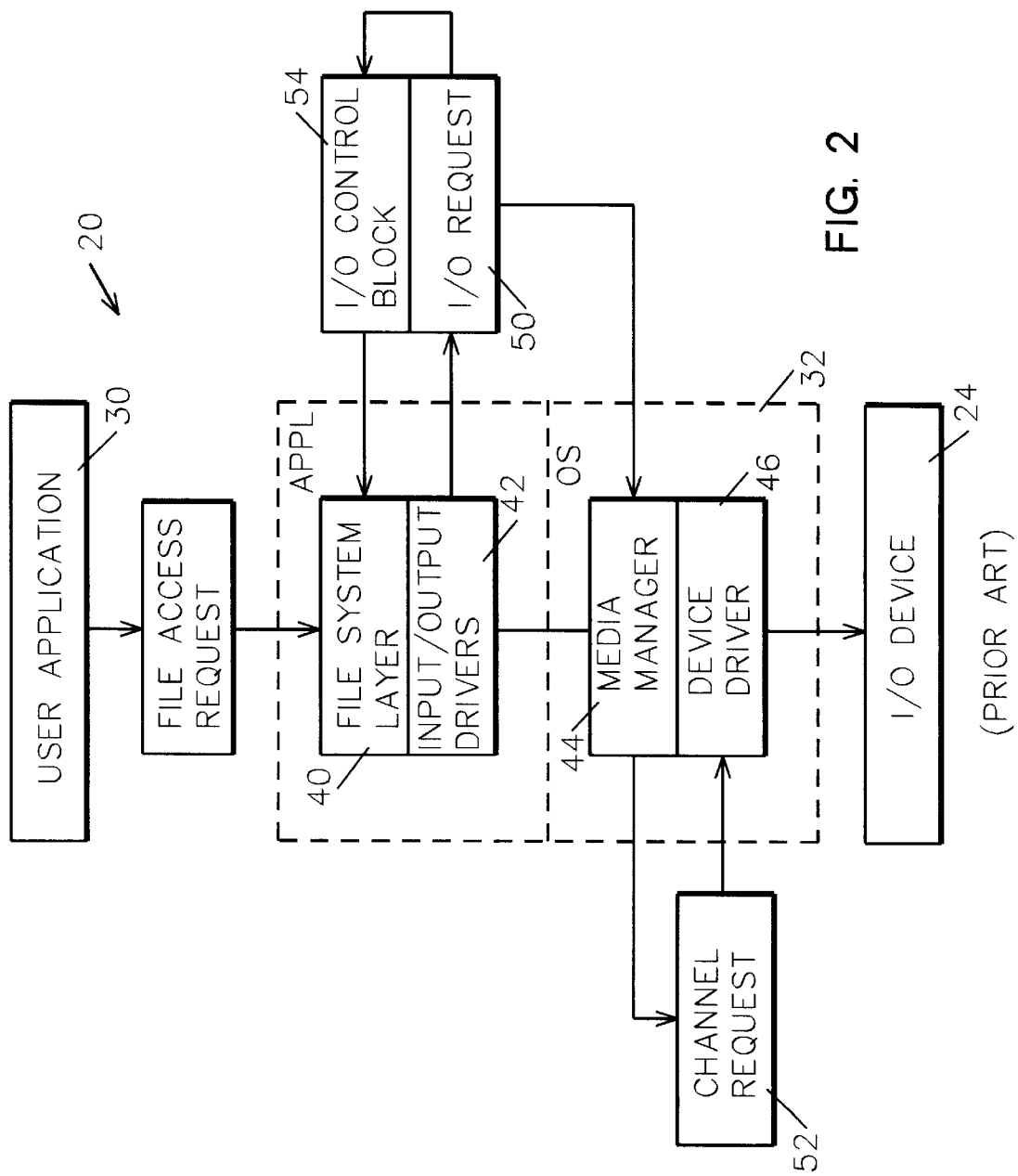
FIG. 2 illustrates a typical, prior art multi-level processing system.
Figure 3:
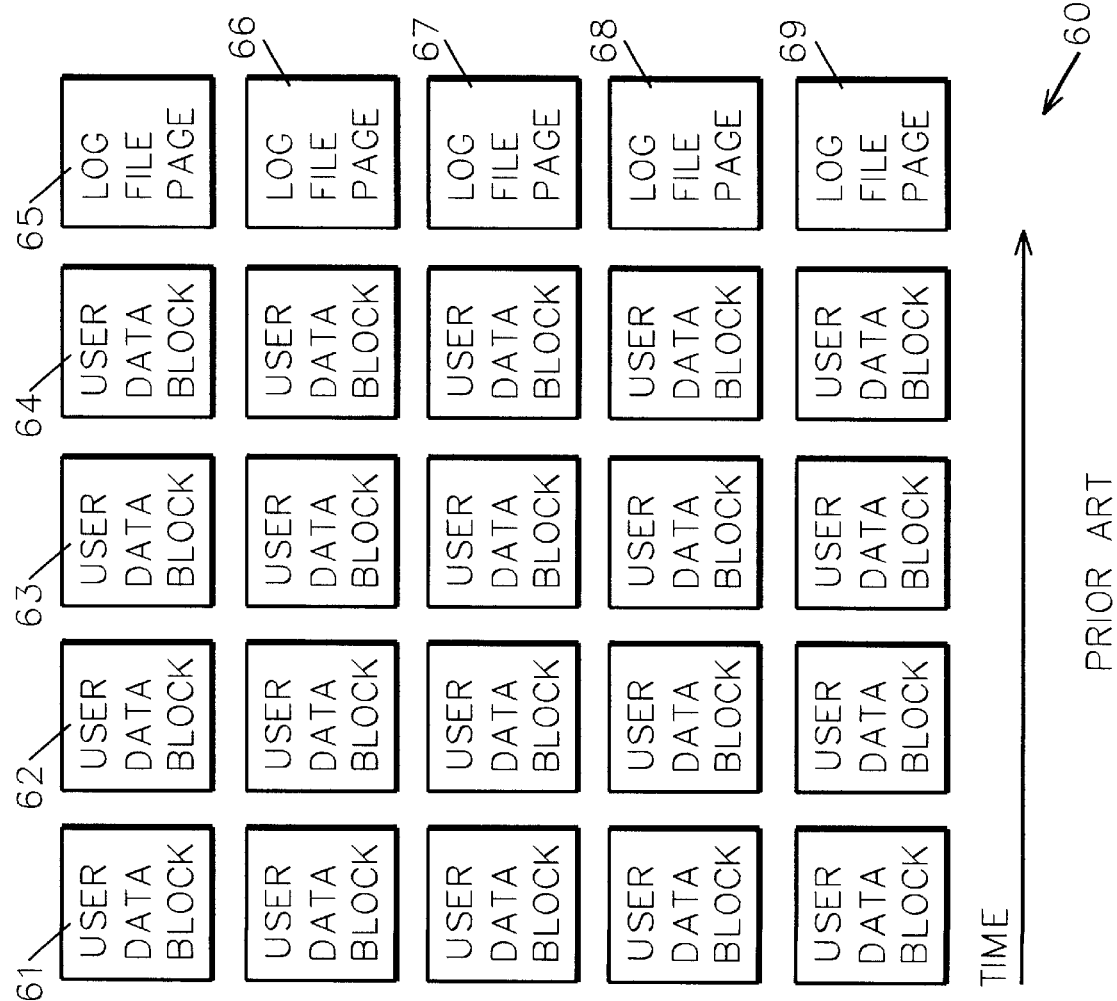
FIG. 3 illustrates a typical I/O access pattern.

A preferred embodiment of the invention adds to a prior implementation of a file system scheduler, similar to that set forth in FIG. 2, a doubly linked list holding queue 74, an Issued I/O counter 84 and a maximum I/O counter 82 to the I/O driver 42. Additionally it adds the MOVE, INIT, and CANCEL requests (lines 79, 86 and 88) to the I/O driver interface and adds an IMMEDIATE flag to the Issue I/O Request. The WAIT request existed in the prior implementation but is modified to deal with the holding queue and I/O counters. Like the prior implementation, an I/O request is represented by a control block 72. Whenever an I/O completes at the disk, the device driver 44 schedules an I/O complete task 80 to run and handle I/O completion, this task is now modified to deal with the holding queue and I/O counters. The service queue 76 is unmodified from prior implementation, it is now a first come first served queue to keep pending I/O requests to the disk. Specifically, the INIT request to the I/O driver is used to initialize an I/O device for subsequent I/O. New with the INIT request is a specification of what the value of the Max I/O counter 82 should be. This value specifically represents the maximum number of I/O requests that would be contained in the service queue 76 and/or being processed by the device 24 before I/O requests are placed in the holding queue 74. The Issued I/O counter 84 is simply the count of I/Os that are in either the service queue 76 or are being processed by the device 24. Thus in general when an I/O request 72 is made to the I/O driver 42, the Issued I/O count 84 is compared to the Max I/O count 82, if the Issued I/O count is less, the I/O is sent directly to the service queue 76, if not less then its placed in the holding queue 74. The system allows the Issued I/O count 84 to exceed the Max I/O count 82—the two counters are used to determine as described above when a new I/O request is placed in the holding queue. The preferred embodiment of the I/O driver makes no restrictions on the Max I/O count 82, just that it is a positive number.

In the preferred embodiment, the Max I/O count will be set to a small number (say 1 or 2) to allow for greater control over the ordering of I/O by the callers of the I/O driver.

Figure 5:
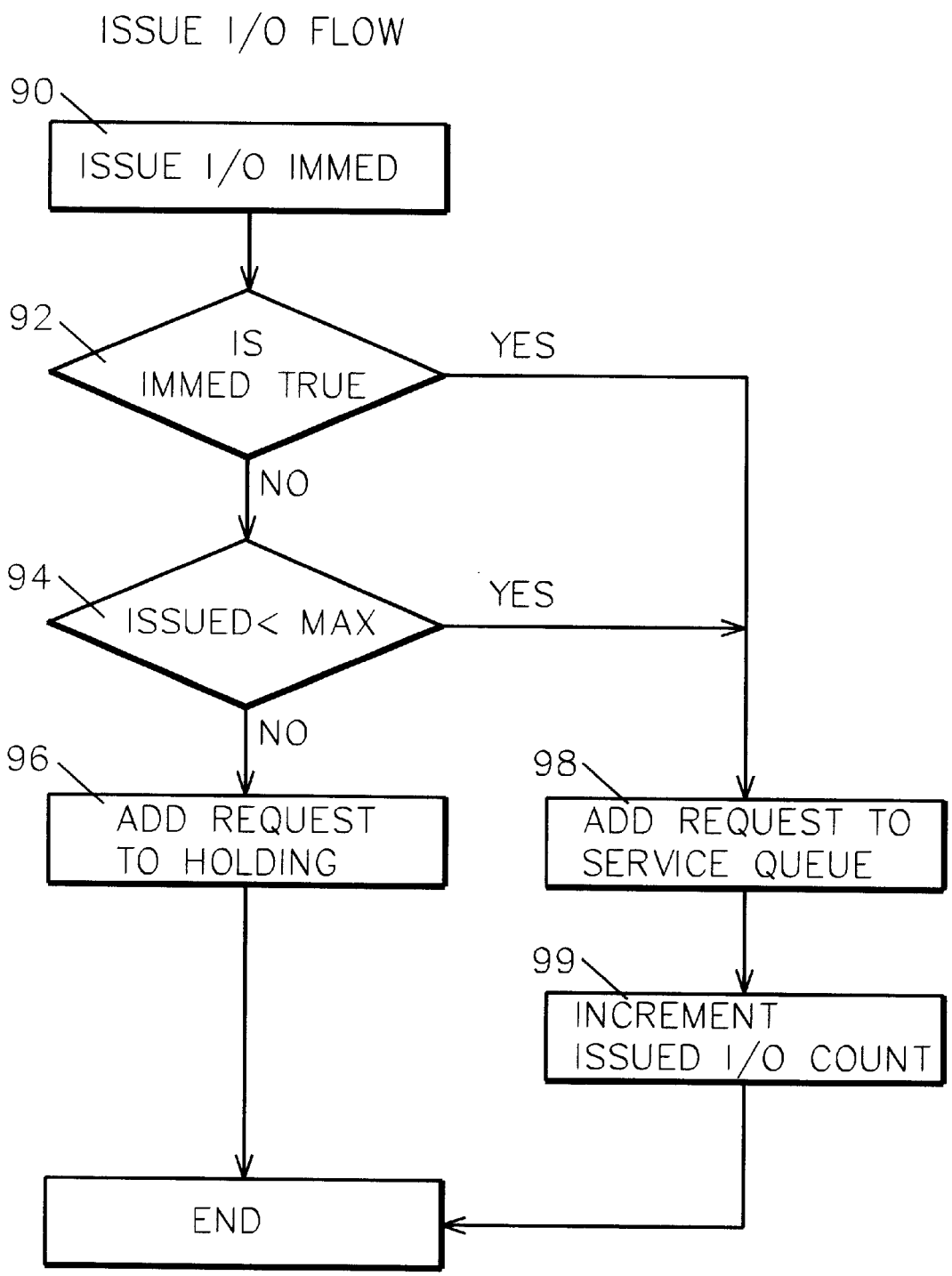
FIG. 5 is a flow diagram of the issue I/O steps of the method of the preferred embodiment of the invention.

Referring to FIG. 5, the flow of the ISSUE I/O request is shown. The I/O driver provides an ISSUE I/O request interface, that is now modified to include an IMMEDIATE flag. This flag is used to indicate if an I/O request should be sent to the service queue 76 immediately or not. This allows callers to bypass other I/O requests previously issued. In step 92, the IMMEDIATE flag is checked 92. If it is not set, then in step 94 the Issued I/O count 84 is compared to the Max I/O count 82. In step 96, if the count is not less, then the request is added to the holding queue 96. If the count is less, in steps 98 and 99 the I/O request is added to the service queue and the Issued I/O count is incremented. If the IMMEDIATE flag is set, then in step 98 the request is added to the service queue and the Issued I/O count is incremented in step 99.

Figure 6:
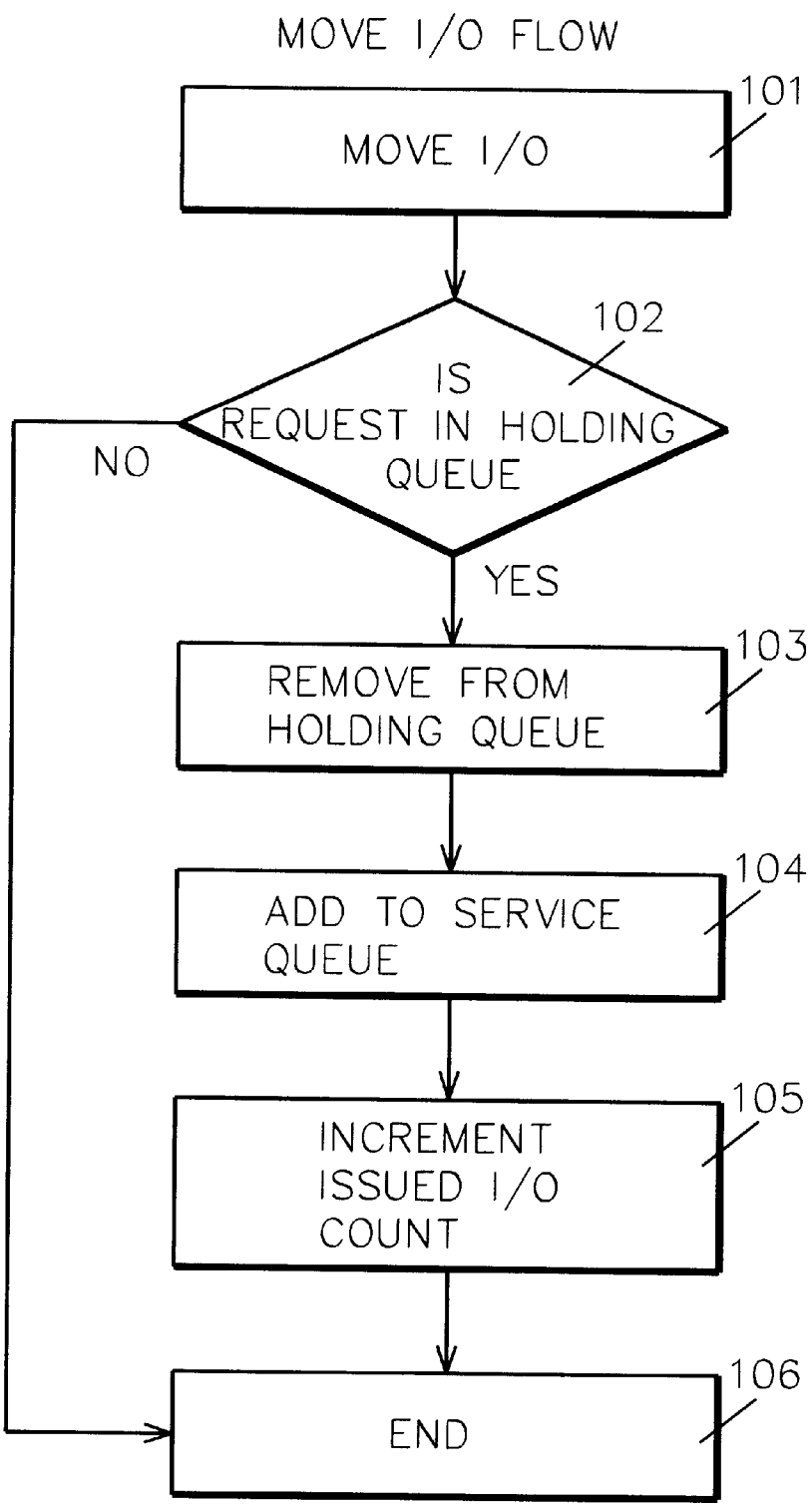
FIG. 6 is a flow diagram of the move I/O steps of the method of the preferred embodiment of the invention.

Referring to FIG. 6, a new interface to the I/O driver provided in the preferred embodiment of the invention is the MOVE request. This allows movement of the I/O from the holding queue to the service queue and thus allows the caller to bypass (move ahead) of I/Os in the holding queue. In step 102, processing of the MOVE request first checks to see if the I/O request is in the holding queue 102. If it is not, then there is nothing else to do since the request is either in the service queue 76, being processed by the device 24 or its completed already. If the request is in the holding queue, in step 103 it is removed from the holding queue, in step 104 it is added to the service queue, and in step 105 the Issued I/O count is incremented.

Figure 7:
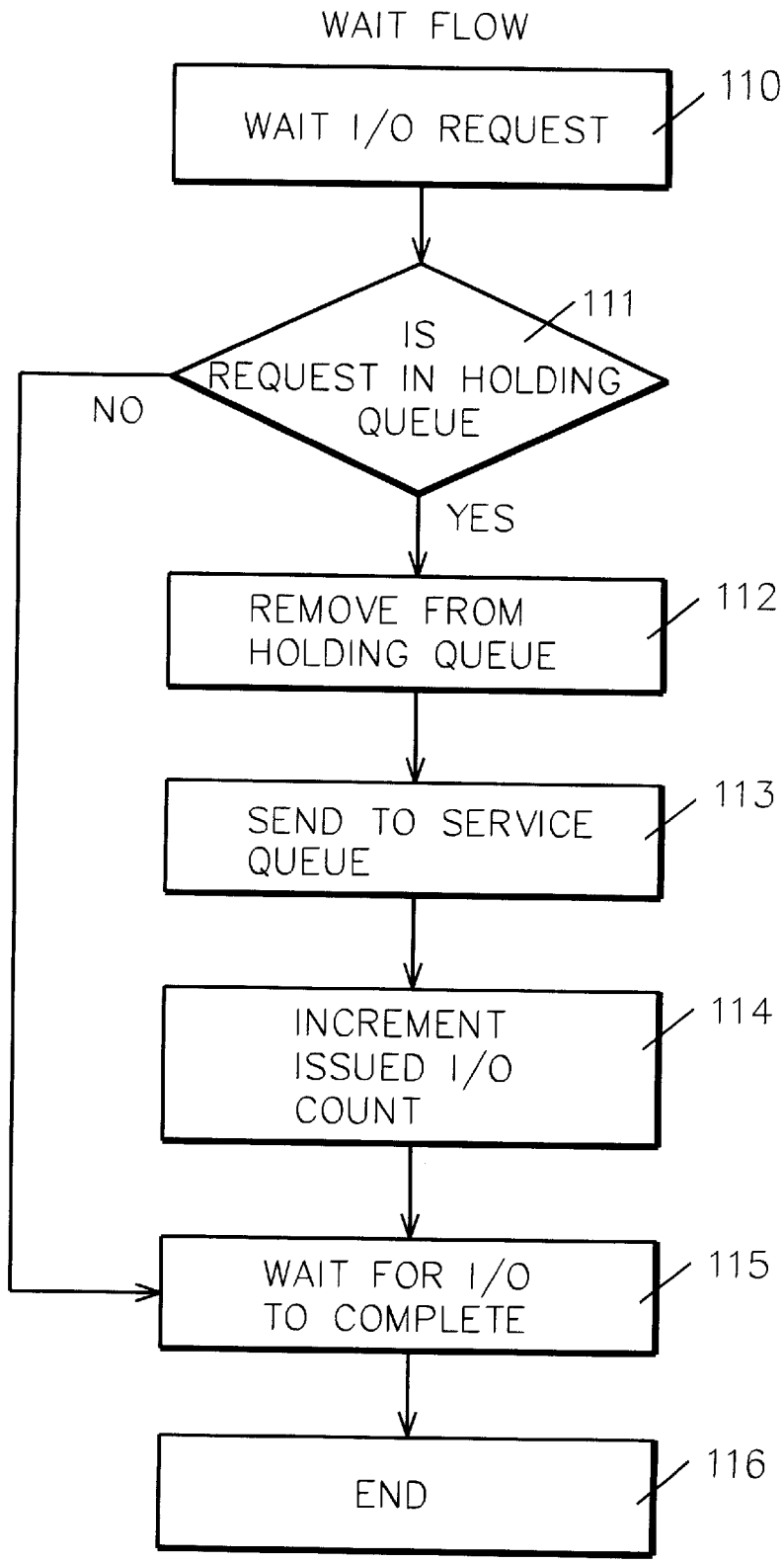
FIG. 7 is a flow diagram of the wait I/O steps of the method of the preferred embodiment of the invention.

Referring to FIG. 7, the WAIT for I/O interface 110 is not a new interface but is modified to check to see if the request is in the holding queue or not. The WAIT interface is used when a task wants to wait for an I/O to complete, thus it does not want to proceed unless an I/O is complete and if it is not complete it is made to wait until the I/O is complete. Since a task that wants to wait for an I/O is being made to wait, the I/O request is given the highest priority and is moved to the service queue if it is in the holding queue. In step 111, the request is checked to see if it is in the holding queue, and if it is, in step 112 it is removed from the holding queue 112, in step 113 it is sent to the service queue, and in step 114 the Issued I/O count is incremented. In step 115, the I/O is then waited on. If it is determined in step 111 that the I/O was not in the holding queue at time of wait then its simply waited on in step 115. This is again another means of re-ordering I/O, waiting on an I/O is the highest form of prioritization since the caller knows that it needs an I/O complete as soon as possible.

Figure 8:
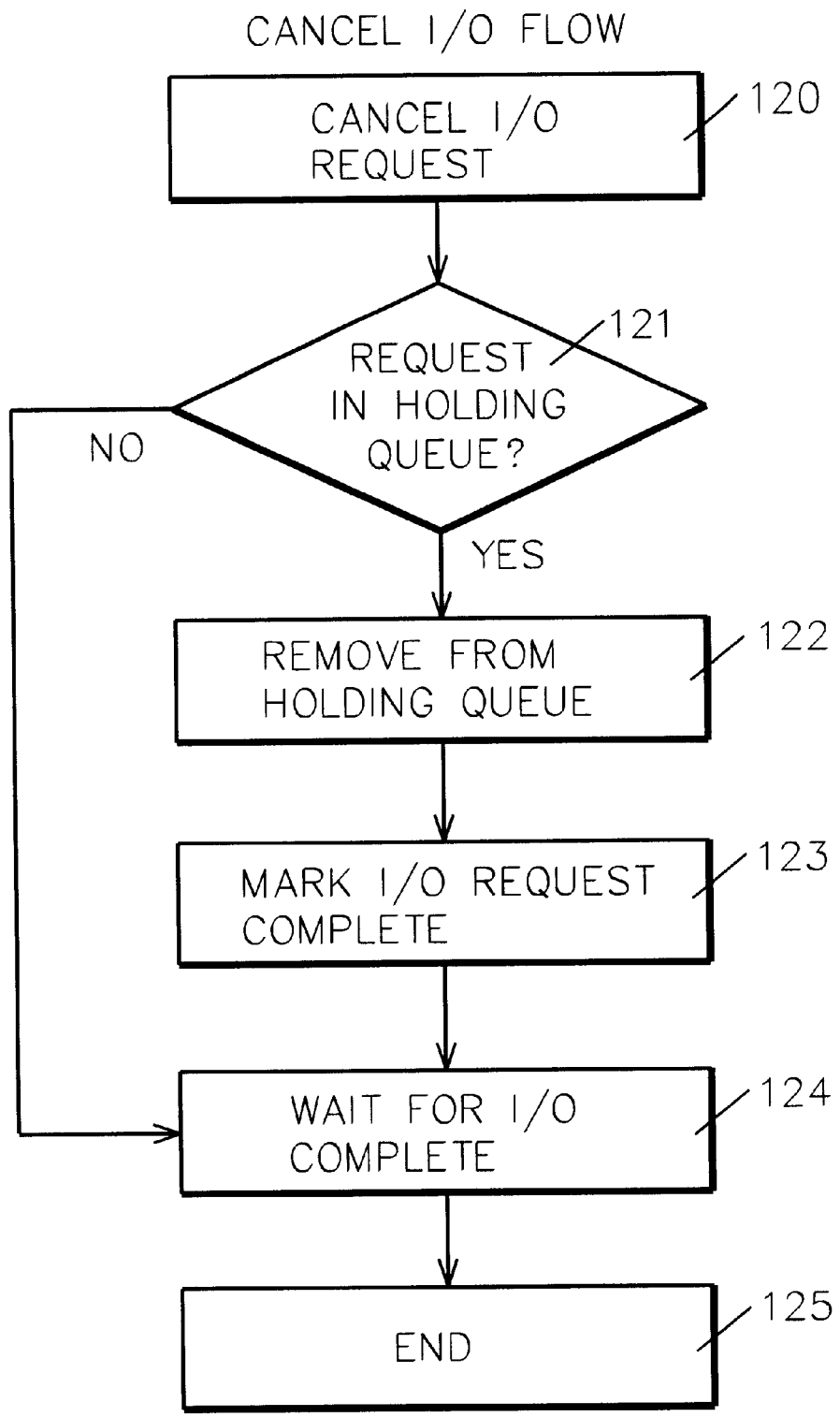
FIG. 8 is a flow diagram of the cancel I/O steps of the method of the preferred embodiment of the invention.

Referring to FIG. 8, the CANCEL request is new with the I/O interface and represents the ability to cancel an I/O request that is determined at a later time no longer to be necessary. Its job is to quickly remove the request from the holding queue and mark it complete (never really sending it to the service queue or the device). By setting the Max Issued count 82 to a small number this will allow for a very fast cancel command since removing a request from a doubly linked list (the holding queue) is a fast operation. In step 121 the CANCEL request must first check to see if the request is in the holding queue 121. If it is then in step 122 it removes the request from the queue, in step 123 marks the request as "I/O complete" and in step 124 waits for the I/O to complete. Since it already marked the I/O complete in step 123, step 124 is satisfied immediately and no real task waiting is done. If in step 121 it was determined that the I/O request was not in the holding queue then the I/O is waited on in step 124 (it is already completed, or is being processed by the physical device).

Figure 9:
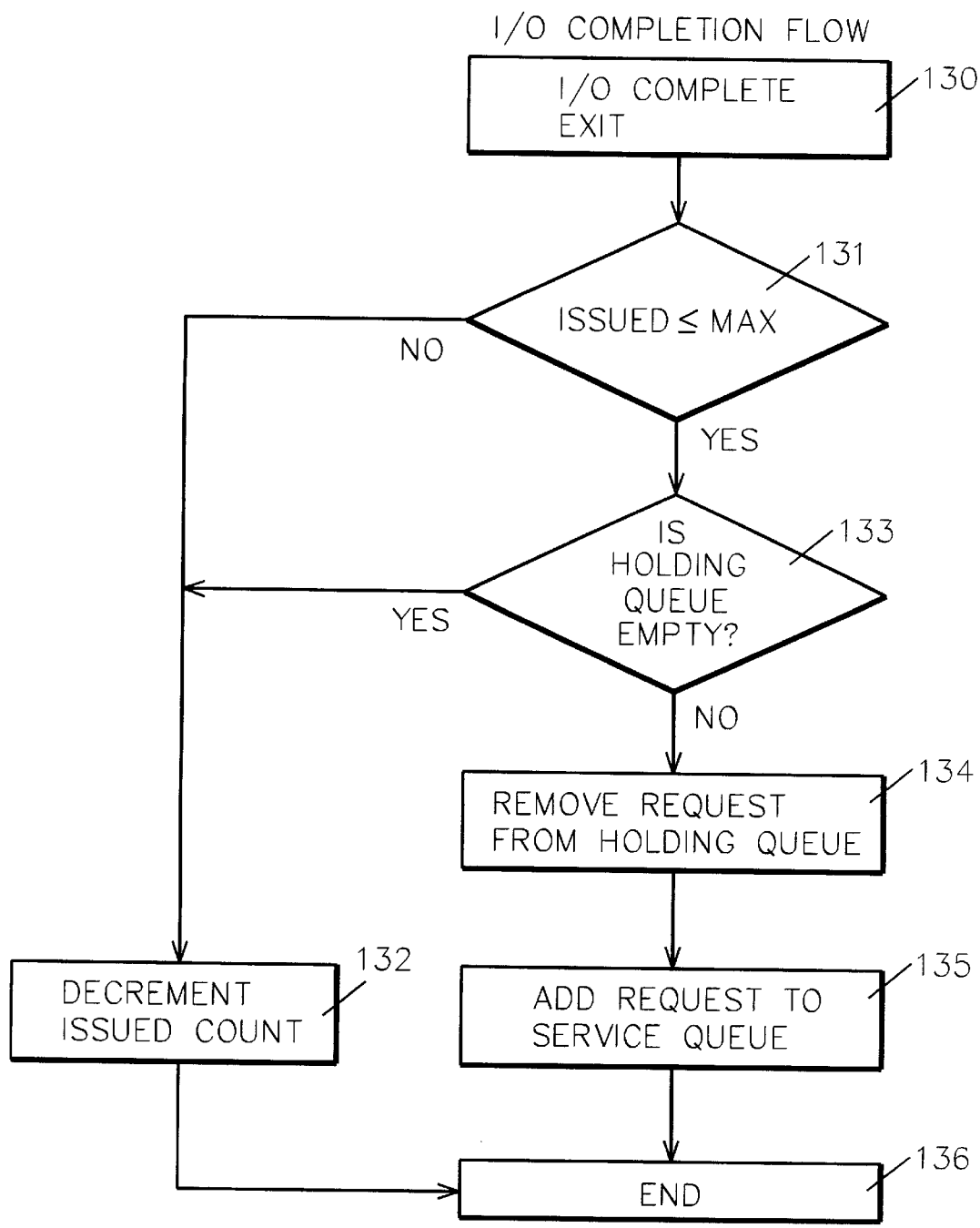
FIG. 9 is flow diagram of the I/O completion steps of the method of the preferred embodiment of the invention.

Referring to FIG. 9, whenever an I/O request is completed by the device 24, the Media Manager schedules an I/O completion task. In step 131, whenever an I/O completes, the Issued I/O count 84 is compared to the Max I/O count 82; if it is greater, then in step 132 the Issued I/O count is decremented. However, if the Issued I/O count 84 is less than or equal to the Max I/O count 82, in step 133 the holding queue is checked to see if it is empty or not. If the holding queue is empty then in step 132 the Issued I/O count 84 is decremented. If the queue is not empty then in step 134 the request at the head of the queue is removed and in step 135 the request is sent to the service queue.

Thus, in accordance with the preferred embodiment of the invention, two new counters, a new layer of queuing, and new interfaces are provided. However, alternative embodiments within the scope of the invention include the use of a holding queue that is not a doubly linked list. It could be singly linked, an array, etc. Any implementation of a computer system queue could be used. There could be more than one holding queue, to possibly facilitate priority assignment. While the preferred embodiment described all I/Os are assigned the same priority, priority assignment could be added. This would permit, for example, to later order the I/Os, but in absence of any reordering of I/O's, relative priorities may be used, following any prior art techniques of doing so. By doing this, the system can allow for later adjustment of I/O priorities on the MOVE interface. Thus MOVE might not only mean to move from holding to service, but also to adjust priority within the holding/service queues. The service queue could be more than one queue, again for priority assignment, or could be eliminated entirely, in that case the Max I/O Count 82 would represent the number of I/Os being processed by the device hardware. The CANCEL request could be an option to the WAIT request or a seperate request. Finally, the I/O driver could be combined with the Media Manager and thus the solution can be made part of the Operating System I/O interface itself, OR the solution can be implemented on top of the Operating System (which makes it an application to the operating system) as in the preferred embodiment described, which puts an I/O driver on top of Media Manager.

Thus, several alternative embodiments are contemplated by the invention, including a tailorable Max I/O count, one or more holding queues, 0 or more service queues, an Issued I/O count, and (most importantly) the provision of the CANCEL, MOVE and INIT routines, along with the changes to ISSUE and WAIT described above. All of this to facilitate ordering of I/O in the order needed by the application, but not requiring the application to know when an I/O is issued how important it is or when it should be completed relative to other I/Os that were previously issued.

Advantages Over the Prior Art

It is an advantage of the invention that there is provided an improved system and method for I/O request scheduling.

It is an advantage of the invention that it minimizes I/O wait time for writing large files for logging file systems by ensuring write performance is close to memory transfer speeds which are much faster than the physical device speeds.

It is an advantage of the invention that there is provided a system and method which enables an application to adjust the priority of an I/O request after that request has been issued.

It is an advantage of the invention that there is provided a system and method which enables an application to cancel an I/O request after that request has been issued.

It is an advantage of the invention that there is provided a system and method enabling a user application to adjust I/O request priority when information is available identifying which I/O requests are most important.

Alternative Embodiments

While the specific embodiment described implements the system and method of the invention in application code running on the operating system, an alternative and, in important respects preferred, embodiment is to provide this same function in the base operating system (such as the IBM MVS Operating System) which frees the application from having to provide code.

Further, priority may be associated with an I/O request when it is scheduled, and this would make the holding queue a non first-come first-served order. Thus priority schemes could be incorporated along with the system and method of the invention to provide further flexibility.

It should be further noted that the invention is not limited to a single holding queue and service queue. The invention would work the same if either the holding queue or service queue (or both) were actually multiple queues, possibly distinguishing requests based on priority. The important concept here is that there is a dividing line between the holding and service queues and that direct control of movement of requests over that line to the application be provided.

The preferred embodiment is not limited as to the size of the service pending queue. However, a very small queue size (say, for example, 2) would have the advantage of giving applications almost total control over the I/O.

It will be appreciated that, although specific embodiments of the invention have been described herein for purposes of illustration, various modifications may be made without departing from the spirit and scope of the invention. In particular, it is within the scope of the invention to provide a program storage or memory device such as a solid or fluid transmission medium, magnetic or optical wire, tape or disc, or the like, for storing signals readable by a machine for controlling the operation of a computer according to the method of the invention and/or to structure its components in accordance with the system of the invention.

Accordingly, the scope of protection of this invention is limited only by the following claims and their equivalents.

We claim:

1. A method for scheduling at least one I/O request, comprising the steps of:
   issuing said I/O request to a device driver;
   placing said I/O request in an I/O request holding queue; and
   under control of the entity issuing said I/O request to said device driver, selectively canceling or moving said I/O request to a service pending queue for execution.

2. The method of claim 1, further comprising the steps of:
   serving to said entity information regarding contents of said request holding queue and selectively of said service pending queue; and
   operating said entity responsive to said information to influence the order of execution of I/O requests in said holding queue.

3. The method of claim 2, said entity residing at the application level of a data processing system.

4. The method of claim 2, said entity residing at the operating system level of a data processing system.

5. A method for operating a device driver for scheduling input/output requests, comprising the steps of:
   receiving a plurality of I/O requests into a holding queue;
   responsive to user request, selectively either canceling or moving specific I/O request from said holding queue to a service queue; and
   executing I/O requests in said service queue.

6. A method for scheduling input/output requests, comprising the steps of:
   queuing scheduled requests; and
   responsive to events subsequent to said queuing step, selectively either canceling or moving a queued to a service queue for execution.

7. The method of claim 6, further comprising the step of:
   operating a user application to monitor said events and to initiate said either canceling or moving step.

8. The method of claim 7, further comprising the steps of:
   queuing newly scheduled requests in a holding queue;
   upon said user application initiating said either canceling or moving step for a selected request, moving said selected request from said holding queue to a service queue.

9. The method of claim 6, further comprising the step of:
   further responsive to events subsequent to said queuing step, selectively canceling a queued request.

10. The method of claim 8, further comprising the step of:
    removing I/O requests from said holding queue and scheduling them to said service queue when the count of outstanding I/O requests falls below a specified threshold.

11. A system for scheduling an I/O request, comprising:
    a device driver;
    an input/output interface for issuing said I/O request to said device driver;
    an I/O request holding queue for holding said I/O request upon being issued to said device driver; until selectively either canceled or moved to a service pending queue;
    said service pending queue, responsive to a command from an entity issuing said I/O request to said device driver, for selectively canceling or receiving said I/O request from said holding queue for execution.

12. A system for scheduling input/output requests for a user application, comprising:
    a holding queue for receiving a plurality of scheduled I/O requests; said application selectively either canceling or moving said I/O requests from said holding queue to a service queue;
    said service queue for executing I/O requests moved from said holding queue responsive to a command from said user application.

13. A system for scheduling input/output requests, comprising:
    means for queuing scheduled requests; and
    means responsive to events subsequent to said queuing step for selectively either canceling or moving said requests from said queuing means to a service queue for executing queued requests.

14. A program storage device readable by a machine, tangibly embodying a program of instructions executable by a machine to perform method steps for scheduling at least one I/O request, said method steps comprising:
    issuing said I/O request to a device driver;
    placing said I/O request in an I/O request holding queue; and
    under control of the entity issuing said I/O request to said device driver, selectively either canceling or moving said I/O request to a service pending queue for execution.

15. An article of manufacture comprising:
    a computer useable medium having computer readable program code means embodied therein for scheduling I/O requests, the computer readable program means in said article of manufacture comprising:
    computer readable program code means for causing a computer to effect issuing said I/O request to a device driver;

computer readable program code means for causing a computer to effect placing said I/O request in an I/O request holding queue; and computer readable program code means for causing a computer to effect under control of the entity issuing said I/O request to said device driver, selectively either canceling or moving said I/O request to a service pending queue for execution.

* * * * *